Oct. 3, 1950 — J. W. ORENDORFF — 2,524,206
SAFETY DEVICE FOR TRACTOR IMPLEMENTS
Filed Oct. 22, 1947 — 2 Sheets-Sheet 1

INVENTOR.
John W. Orendorff
BY Paul O. Pippel
Atty.

Oct. 3, 1950 — J. W. ORENDORFF — 2,524,206
SAFETY DEVICE FOR TRACTOR IMPLEMENTS
Filed Oct. 22, 1947 — 2 Sheets-Sheet 2

INVENTOR.
John W. Orendorff
BY Paul O. Pippel
Atty.

Patented Oct. 3, 1950

2,524,206

UNITED STATES PATENT OFFICE 2,524,206

SAFETY DEVICE FOR TRACTOR IMPLEMENTS

John W. Orendorff, Canton, Ill., assignor to International Harvester Company, a corporation of New Jersey Application October 22, 1947, Serial No. 781,450

8 Claims. (Cl. 180—82)

This invention relates to agricultural machines and particularly to power driven machines.

In power driven agricultural machines, particularly where earth penetrating tools are utilized and where the machine is capable of moving in forward and reverse directions it often happens that an operator will reverse the direction of his machine while the working tools are in operating position. If, for example, the digging blade is in the ground at the time the machine is thrown into reverse, serious damage ensues. While it is not unknown to provide means for preventing the reversal of an automotive vehicle in certain circumstances no adequate provision has been made until the present time for guarding against damage to earth-working tools and the like.

It is therefore an object of the present invention to provide in combination with a vehicle having an implement thereon movable between operating and inoperative positions, means for effectively preventing movement of the machine in the wrong direction when the implement is in its operating position.

Another object of the invention is to provide in connection with a power driven agricultural machine having an implement thereon, means coordinated with the movement of the implement to working position for preventing movement of the machine in a direction to cause damage to the implement.

A further object of the invention is to provide an improved reverse lock-out for a machine having forward and reverse gearing.

Another object of the invention is to provide in a power driven machine such as an agricultural implement having forward and reverse gearing, means responsive to movement of the implement working part for operating the reverse lock-out.

Other objects and advantages of the invention will become clear from the following detailed description when read in conjunction with the accompanying drawings, in which:

Figure 4 is an enlarged detail partly in section showing a plan view of the reverse lock-out device.

Figure 1:
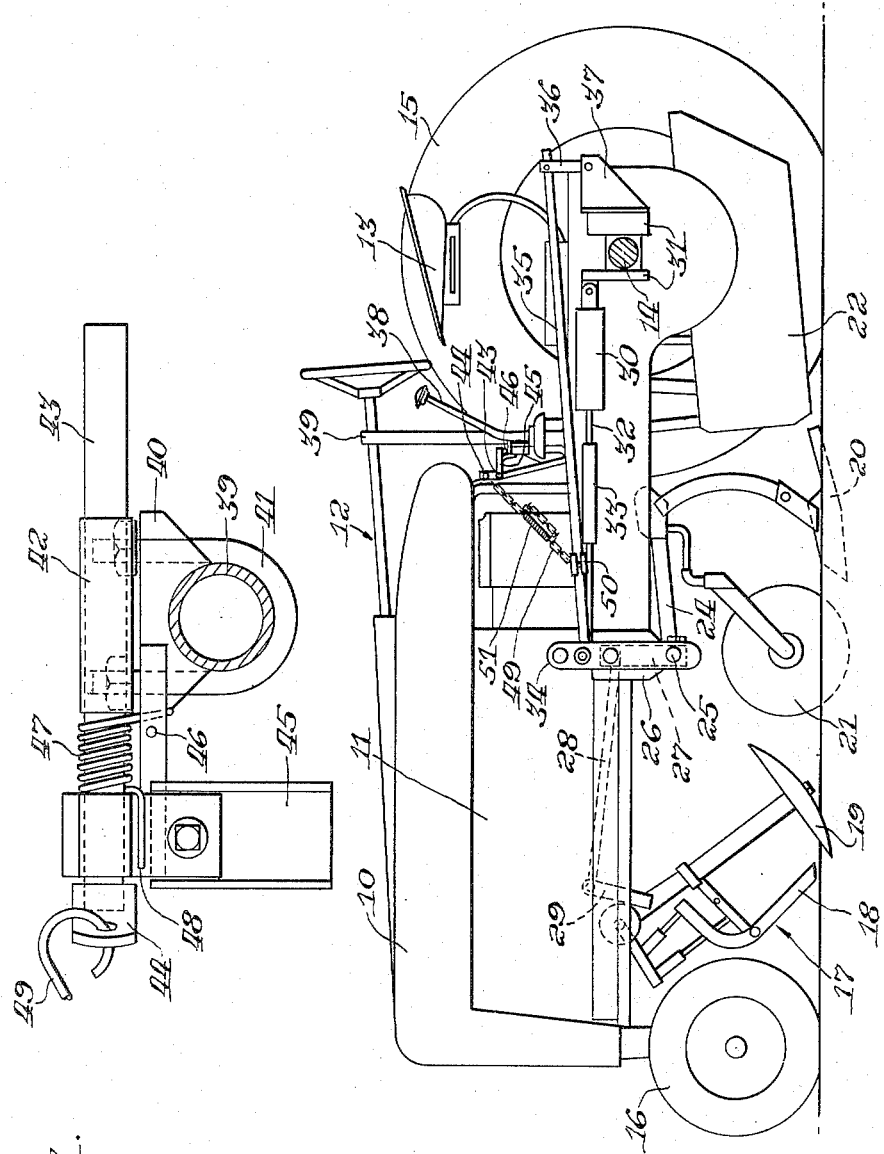
Figure 1 is a view in side elevation showing an agricultural machine in the form of a tractor with an implement mounted thereupon embodying the features of the present invention.

In the drawings, the numeral 10 designates the longitudinal body of a tractor having a power plant indicated at 11, a steering mechanism 12 and an operator's seat 13. The tractor is provided with a transverse rear axle structure 14, rear drive wheels 15, only one of which is shown, and dirigible front wheels 16.

The implement with which the present invention is concerned is shown as mounted upon a tractor and comprises mechanism for the harvesting of beets. The details of construction of the harvesting mechanism forms no part of the present invention and a more complete description thereof may be found in U. S. application Serial No. 691,188, filed August 17, 1946. It may be noted, however, that the beet harvester includes a topping unit 17 mounted upon the side of the tractor for vertical movement with respect thereto and comprises a feeler gauge 18 and a cutting disk 19. The feeler gauge is adapted to engage the beets and to rise and fall with the variations in height thereof, carrying the blade 19 upwardly and downwardly with it. The crown and foliage is separated from the beet by the cutting blade 19. Likewise mounted upon the side of the tractor and rearwardly of the topping unit 17 is a digging unit 20 adapted to penetrate the soil and lift the beets therefrom. The soil in advance of the digger 20 is opened by a coulter 21. Rearwardly of the digger 20 a conveyor 22 is provided and suitably suspended from the tractor body. The conveyor 22 functions as a combined agitator and conveyor adapted to receive the beets withdrawn by the blades 20 and to convey them rearwardly.

The digger 20 is secured to a support 24 affixed to a transversely extending shaft 25 rockably mounted in brackets 26 affixed to and depending from the tractor body. Likewise secured to the shaft 25 at the end thereof projecting from the right-hand side of the tractor is a vertically extending arm 27 which is connected by a rod 28 to an arm 29 mounted upon the topping unit 17. It will thus be observed that rocking of the arm 27 in an anticlockwise direction as viewed in Figure 1 will raise the digger and topper units out of the ground to a transport position.

Movement of the harvester tools between ground working and transport positions is accomplished by operation of a power cylinder 30 preferably of the hydraulic type deriving power from the tractor and mounted upon an attaching structure 31 secured to the rear axle structure 14. Cylinder 30 is provided with a piston rod 32 slidably received in a sleeve member 33 pivotally connected to the upper portion of an arm 34 secured to the left-hand end of the transverse rock-shaft 25. Likewise pivotally connected to the arm 34 is a push rod 35, the rear end of which is connected to an arm 36 pivoted upon an extension 37 of the attaching structure 31.

As pointed out before, in an implement of the type described mounted upon a tractor having a power plant and forward and reverse gears, it is important that the implements be raised to their inoperative position before the tractor is placed in reverse for any reason. In a normal operation it is often necessary for the tractor operator to reverse his machine to avoid obstacles and the like and should he fail to move his implement to its inoperative position, the danger of damage to the working tools is very great. Provision is therefore made by the present invention to overcome this difficulty and prevent the operator from throwing the machine into reverse if the working tools are in the ground. The mechanism by which this is accomplished is associated with the gear shifting lever 38 which is movably mounted upon the tractor in a position accessible to the operator from his seat 13 and alongside the tractor steering post 39.

A bracket 40 is mounted upon the steering post 39 and secured thereto by means of a U-bolt 41. This bracket is provided with a bearing portion 42 to rotatably receive a transversely extending shaft 43 provided at one end thereof with a rock arm 44. Likewise secured to the shaft adjacent the arm 44 is an abutment or stop member 45 which extends radially from the shaft 43 at right angles to the arm 44. Secured to the bracket 40 parallel to the shaft 43 and extending below the stop member 45 is a pin 46 to which is secured one end of a spring 47 wound about the shaft 43 and having its other end 48 bent axially and engaging the member 45.

Figure 2:
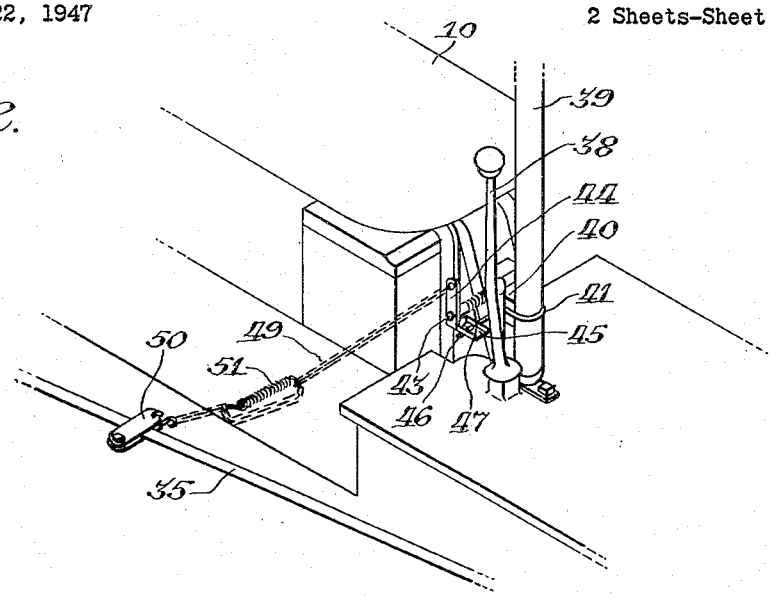
Figure 2 is a perspective view of a stop mechanism which prevents throwing the gears of the machine into reverse and the connection thereof with the lifting mechanism for the implement.
Figure 3:
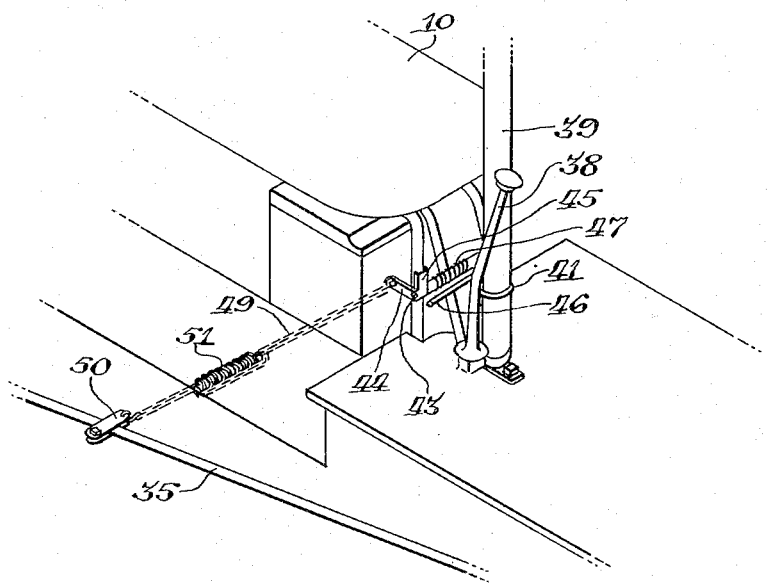
Figure 3 shows the same structure as Figure 2 but with the stop or locking mechanism in its inoperative position.

The spring 47 urges the rock-shaft 43 to rotate in a direction to place the stop or locking member 45 in the position as indicated in Figure 2. In this position the stop member 45 is closely adjacent the movable lever 38 provided for shifting the gears of the tractor. It may be understood that in the position of the parts indicated in Figure 2, the control lever 38 is in the neutral position and cannot be thrown into reverse position without encountering the stop 45. The presence of the stop 45 prevents forward movement of the control lever 38 and effectively locks out the reversing gear. The spring 47, as previously stated, urges the member 45 to locking position with respect to the control lever 38 and this is to be desired when the implement is in operating position, otherwise a sudden reversal of the machine might seriously damage the parts thereof. On the other hand, when the implement is to be raised to transport position, it is desirable that the machine or tractor be readily maneuverable in any direction. With this object in view, the arm 44 of the reverse lock-out mechanism is connected by a chain 49 to a clip 50 secured to the push rod 35. Slack is taken up in the chain 49 by a spring 51. It will now be noted that upon the extension of piston 32 in the cylinder 30 the arm 34 and therefore push rod 35 will move forwardly and rock to the shaft 43 of the reverse lock-out mechanism in an anti-clockwise direction, as viewed in the drawings to the position shown in Figure 3. This movement of the lifting mechanism and of the arm 34, as pointed out before, raises the harvesting tools to inoperative or transport position. In this position the shaft 43 has rotated until the stop member 45 extends vertically upwardly and is no longer in a position to abut the control lever 38 upon movement thereof toward the gear reversing position. Upon retraction of the piston 32 in the cylinder and the return of the working parts into operating position the stop member 45 under the bias of spring 47 is likewise returned to its operating position adjacent the control lever 38 to effectively prevent the movement thereof into gear reversing position. Pin 46 limits movement of member 45.

It is believed that the operation of the mechanism of the present invention will be clearly understood from the foregoing description. It should also be understood that the invention has been described only in its preferred embodiment and that modifications may be made therein without departing from the spirit of the invention. It is therefore desired that the invention be limited only by the scope of the appended claims.

What is claimed is:

1. The combination with a tractive vehicle having a power plant and forward and reverse gearing, of an implement mounted upon the vehicle for movement between operating and transport positions, and locking means on the vehicle for locking said gearing against movement into reverse position in response to movement of said implement to operating position.

2. The combination with a tractive vehicle having a power plant and forward and reverse gearing, of an implement mounted upon the vehicle for movement between operating and transport positions, gear locking means on the vehicle, and a connection between said locking means and said implement actuable upon movement of the latter to operating position to lock said gearing against movement into reverse position.

3. The combination with a tractive vehicle having a power plant and forward and reverse gearing, of an implement mounted upon the vehicle for movement between operating and transport positions, lift means on the vehicle connected to said implement for raising and lowering the latter, a control lever on the vehicle movable between positions corresponding to the forward and reverse positions of said gearing for operating the latter, and a stop associated with said lever and actuable in response to lowering the implement to oppose movement of the lever to reverse position.

4. The combination with a tractive vehicle having a power plant and forward and reverse gearing, of an implement mounted upon the vehicle for movement between operating and transport positions, lift means on the vehicle connected to said implement for raising and lowering the latter, a control lever on the vehicle movable between positions corresponding to the forward and reverse positions of said gearing for operating the latter, a movable stop adjacent said lever, and a connection between said stop and said implement and operable upon lowering the implement for moving the stop into a position to oppose movement of the lever to reverse position.

5. The combination with a tractive vehicle having a power plant and forward and reverse gearing, of an implement mounted upon the vehicle for movement between operating and transport positions, lift means on the vehicle connected to said implement for raising and lowering the latter, a control lever on the vehicle movable between positions corresponding to the forward and reverse positions of said gearing for operating the latter, a movable stop adjacent said lever, and a flexible connection between said stop and said lift means and operable upon actuation of the latter to lower the implement for moving the stop into a position to oppose movement of the lever to reverse position.

6. The combination with a tractive vehicle having a power plant and forward and reverse gearing, of an implement mounted upon the vehicle for movement between operating and transport positions, a control lever on the vehicle movable between positions corresponding to the forward and reverse positions of said gearing for operating the latter, stop means on the vehicle movable to and from an operating position adjacent said lever to oppose movement of the latter into reverse position in response to movement of the implement to operating position, and means biasing said stop to the latter position.

7. The combination with a tractive vehicle having a power plant and forward and reverse gearing, of an implement mounted upon the vehicle for movement between operating and transport positions, a control lever on the vehicle movable between positions corresponding to the forward and reverse positions of said gearing for operating the latter, stop means on the vehicle movable to and from an operating position adjacent said lever to oppose movement of the latter into reverse position, means biasing said stop to the latter position, and means responsive to movement of the implement to transport position for withdrawing said stop from its operating position.

8. In a powered agricultural machine having forward and reverse gears and an implement movably carried thereby, the combination of a control lever movable to positions corresponding to the forward and reverse positions of said gears, a shaft rockably mounted on the machine, a radially projecting arm secured to the shaft and movable by rocking the shaft to and from a position closely adjacent said lever, said arm serving as a stop to oppose movement of the lever in one direction, yieldable means biasing said arm to operative position with respect to said lever, and means actuated by movement of said implement in one direction for overcoming the bias of said biasing means.

JOHN W. ORENDORFF.

REFERENCES CITED

The following references are of record in the file of this patent:

UNITED STATES PATENTS

| Number | Name | Date |
|---|---|---|
| 1,409,202 | Sabattier | Mar. 14, 1922 |
| 1,638,802 | Fuci | Aug. 9, 1927 |

FOREIGN PATENTS

| Number | Country | Date |
|---|---|---|
| 25,079 | France | Aug. 19, 1922 |
| 525,763 | Great Britain | Sept. 4, 1940 |